LESLIE & TIBBETTS.
Nursery Cup and Lamp Stove.
No. 80,355.                                   Patented July 28, 1868.
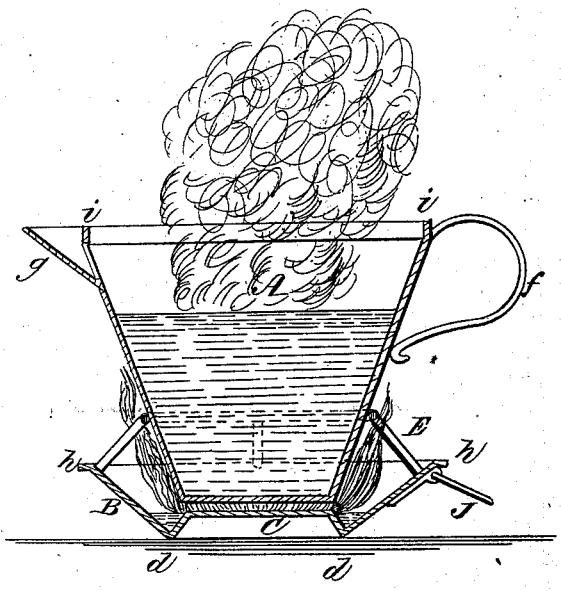
Witnesses
H. C. Ashkettle
Wm A. Morgan
Inventors.
J. P. Leslie
E. A. Tibbits
per Munn & Co
Att'ys

United States Patent Office.

J. F. LESLIE AND EDWIN A. TIBBETTS, OF WOBURN, MASSACHUSETTS.

Letters Patent No. 80,355, dated July 28, 1868.

IMPROVEMENT IN NURSERY-CUPS.

The Schedule referred to in these Letters Patent and making part of the same.

TO ALL WHOM IT MAY CONCERN:

Be it known that we, J. F. LESLIE and EDWIN A. TIBBETTS, of Woburn, in the county of Middlesex, and State of Massachusetts, have invented a new and improved Nursery-Cup; and we do hereby declare that the following is a full, clear, and exact description thereof, which will enable those skilled in the art to make and use the same, reference being had to the accompanying drawings, forming part of this specification.

The object of this invention is to furnish an article or vessel for heating liquids by the use of alcohol, or some equivalent combustible liquid, which shall be simple, cheap, and convenient, the same being intended more particularly for heating milk for children, water for shaving, as well as for all other purposes for which it is adapted.

And it consists in providing the under side of the cover of a conical metal cup with stays supporting a metallic ring, whereby it is adapted to be reversed to form a support for the cup and a receptacle to receive alcohol or other liquid for heating purposes, as will be hereinafter more fully described.

The drawing represents a vertical section of the cup placed upon the base or bottom, as when in use.

A is the cup, funnel-shaped or flaring in form.

B is the base, which is dishing in form, with a raised bottom, C, and with an annular channel, $d$, in which the alcohol or other liquid is contained.

E represents wire supports or stays, which are attached to the base, B, and to a ring, seen in dotted lines, which ring is placed so that the bottom of the cup will be raised a little from the bottom or raised portion, C, of the base, to allow the flame or heat to come in contact therewith, as seen in the drawing.

$f$ is the handle to the cup.

$g$ is the spout.

The flame from the burning alcohol surrounds the cup, as represented in the drawing.

By this method milk or water, or other liquid, may be heated to any required temperature in a few moments of time, thereby saving much time and trouble.

After using the cup in the manner described, the base, B, may be removed and placed on the top of the cup, where the rim $h$ will fit within the upright flange $i$, the base being reversed in position for that purpose, or turned bottom side up, in which position it forms a tight cover.

J is a ring on the base, by which it is handled.

I claim as new, and desire to secure by Letters Patent—

The nursery-cup, when its cover B is provided with the stays E and ring, whereby it is adapted to be reversed to support said cup and form a heater, as herein shown and described.

J. F. LESLIE,
EDWIN A. TIBBETTS.

Witnesses:
F. A. HARTWELL,
NATHAN WYMAN.